Sept. 7, 1965
N. R. THOMSON
3,204,686
COMBINED MANUAL AND SAFETY VALVE CONTROL
Filed March 26, 1963
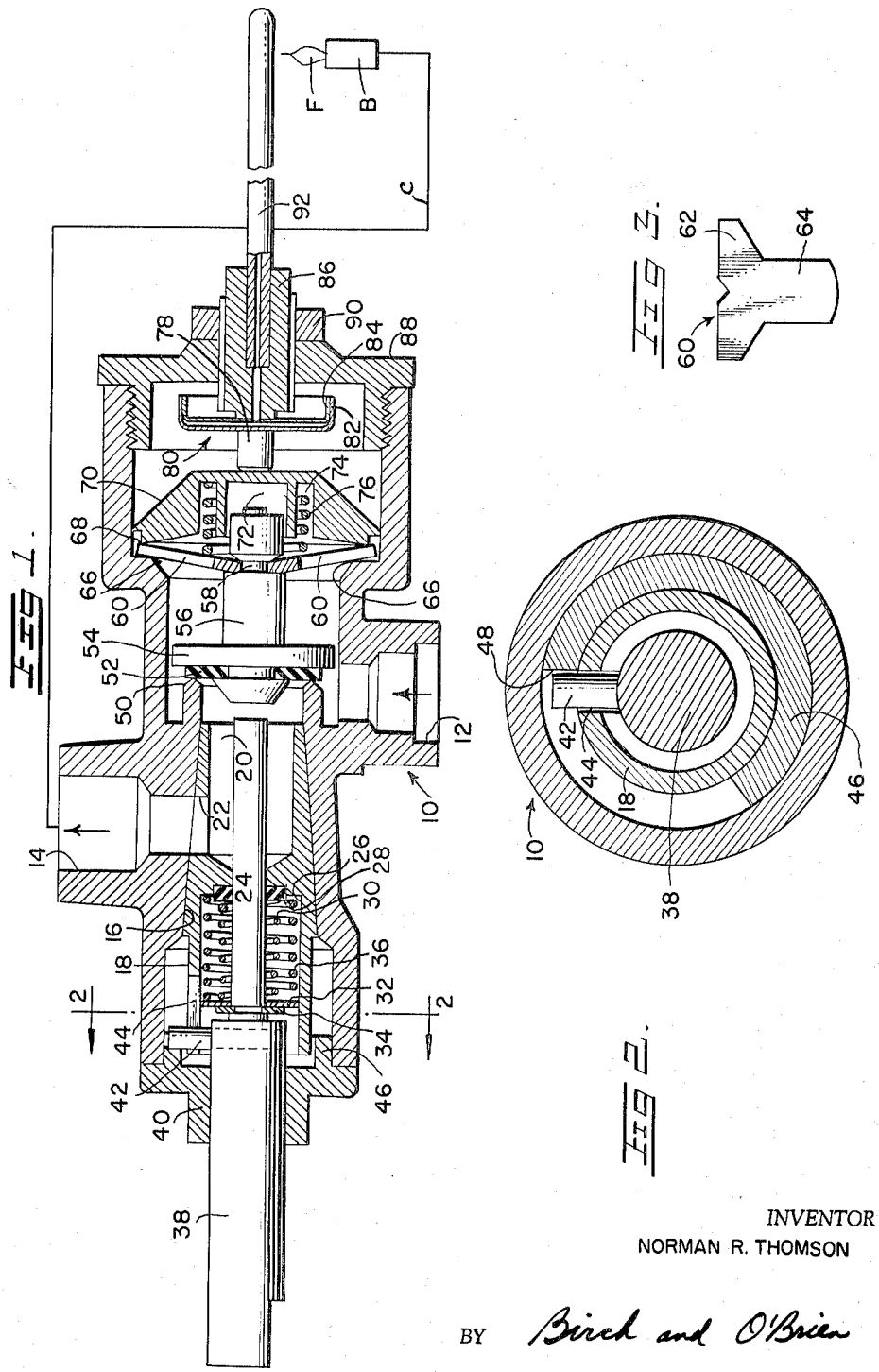
INVENTOR
NORMAN R. THOMSON
BY *Birch and O'Brien*
ATTORNEYS United States Patent Office 3,204,686
Patented Sept. 7, 1965

3,204,686
COMBINED MANUAL AND SAFETY VALVE CONTROL
Norman R. Thomson, Geneva, Switzerland, assignor to Robertshaw Controls Company, Richmond, Va., a corporation of Delaware
Filed Mar. 26, 1963, Ser. No. 268,194
3 Claims. (Cl. 158—140)

This invention relates to control devices and in particular to a thermally responsive safety valve for controlling a flow of gaseous fuel to a burner.

An object of this invention is to support the safety valve member of a control device in axial alignment with its operating elements.

Another object of this invention is to fulcrum the carrying means of a safety valve member on an interior wall of a control device housing.

This invention has another object in that the lever means of a valve stem support are pivoted on a plug member for actuation thereby.

This invention has a further object in that a valve stem lever means are pivotally engaged on opposite surfaces for actuation in both directions.

This invention is particularly applicable, although not limited to the combination of a rotary shutoff cock and a disc valve which is maintained in its on position by thermally responsive means. The disc valve is disposed upstream of the rotary shutoff cock to act as a safety valve and cutoff all the flow of fuel. The safety valve is moved to an open position by a push rod and is maintained in its open position by a flame responsive actuator.

Other objects and advantages of the present invention will become apparent from the following description of a preferred embodiment taken in connection with the accompanying drawing wherein:

FIGURE 1 is a longitudinal section of a control device embodying this invention;

FIGURE 2 is an enlarged section view taken on line 2—2 of FIGURE 1; and

FIGURE 3 is a plan view of a detail of FIGURE 1.

As is illustrated in FIGURE 1, the control device includes a housing, indicated generally at 10, having an inlet port 12 and an outlet port 14. The left end of housing 10 is provided with a tapered valve seat 16 that receives a hollow shut-off cock or plug valve member 18 having a correspondingly tapered surface. The inner end of plug valve 18 defines an open end chamber 20, a wall of which has a port 22 movable into and out of registry with the outlet port 14. A push rod 24 is slidably carried by the plug valve 18 and centrally extends between the chamber 20 and an oppositely disposed chamber 26 in the outer end of plug valve 18.

Communication between the plug chambers 20 and 26 is prevented by an annular seal 28 which snugly surrounds the push rod 24 and which is seated in a recess formed in the bottom wall of chamber 26. The seal 28 is retained in its seat by a coil spring 30 encircling the push rod 24 and mounted in compression between the seal 28 and a washer 32. Outward movement of the washer 32 is limited by a snap ring 34 disposed in a peripheral groove on the push rod 24. A second larger coil spring 36, concentric with spring 30 is mounted in compression between the bottom wall of chamber 26 and the washer 32 and applies the proper spring pressure for biasing the plug valve 18 in the tapered valve seat 16.

The outer end of push rod 24 is secured to a manually operable control stem 38 and extends through the closure bearing cap 40 which is suitably secured to the end of housing 10. The exposed end of stem 38 has a D-shape cross section for the reception of a control knob (not shown). The inner end of control stem 38 carries a transverse pin 42 which is disposed in a longitudinal slot 44 in a wall of the plug valve member 18. By means of the pin 42 and slot 44 connection, the shaft 38 may be rotated to cause rotation of the gas cock 18 and may be displaced axially to cause axial movement of the push rod 24. As is shown in FIGURE 2, the inner end of housing cap 40 is provided with an arcuate portion 46 the opposite ends of which define stops 48 which are engageable by the shaft pin 42 to define the limits of angular rotation of the shaft 38 and gas cock 18.

Adjacent the passageway extending from the inlet port 12 the interior walls of housing 10 are formed into an annular valve seat 50 that is in axial alignment with the push rod 24. A flow of fuel from the inlet 12 to the valve chamber 20 passes through the annular valve seat 50. A valve disc member 52, of any suitable resilient material, cooperates with the valve seat 50 to control the flow of fuel therethrough. The valve member 52 and its back up plate 54 are mounted on one end of a valve stem 56 to define a valve assembly.

The opposite end of the valve stem 56 has a necked down portion 58 for receiving a lever system that affects the valve movement. The lever system includes a pair of levers 60 but only one is being described in detail because they are identical in structure and function. Each lever 60 is substantially T-shaped, formed by a centrally notched leg 62 and a transversely extending leg 64. The notch of each leg 62 is disposed in the necked down portion 58 of the valve stem 56 for rocking movement therein adjacent its free end, the leg 64 has a fulcrum bearing portion engaging a fixed fulcrum 66 formed on an inner wall shoulder of the housing 10 to define a pivotal mounting for the lever 60. Spaced outwardly from the fulcrum 66, the opposite surface of the leg 64 engages a movable fulcrum 68 formed as an annular ring on a movable plug member 70.

The plug member 70 moves axially in the housing 10 with its outer periphery slidably engaging the adjacent interior wall portion of the housing 10. On its side facing the levers 60, the plug 70 has a central recess 72 receiving the end of valve stem 56 and a recess 74 concentric with recess 72 receiving a coil spring 76. The coil spring 76 is mounted in compression between the bottom wall of plug recess 74 and the levers 60.

The side of the plug 70 facing away from the levers 60 is engaged by the end of a power element shaft 78 whose opposite end is integrated with a contractible and expansible power element 80. The power element 80 includes a pair of nested disc diaphragms 82 and 84, sealed at their peripheries with outer diaphragm 82 being connected to the shaft 78 and the inner diaphragm 84 being welded or otherwise secured at its central portion to a mounting stud 86. The bored stud 86 is provided with exterior threads for mounting in the threaded bore of a rear housing closure 88 and for receiving a lock nut 90 which secures the stud 86 adjustably to the closure 88. A capillary tube 92 has one end secured in the central bore of stud 86 and its opposite end forming a temperature sensing bulb which is disposed so as to be responsive to the flame F at a burner B.

The inner disc diaphragm 84 is suitably bored to communicate with the bore of stud 86. The power element 80, the stud 86 and the thermal sensing tube 92 constitute a thermally responsive means which is a closed system filled with mercury which vaporizes in response to the heat from flame F to expand the power element 80.

In order to place the device in operation the control dial and shaft 38 are rotated counterclockwise (as viewed from the left end of FIG. 1) to the position shown in FIGURES 1 and 2 wherein the gas cock port 22 is in registry with the passageway leading to the outlet opening 14. The shaft 38 is then depressed against the bias of coil spring 36 whereby the inner end of push rod 24 displaces the valve stem 56 to open the safety valve element 52 relative to the valve seat 50. When moved to a depressed condition by push rod 24, the valve stem 56 causes the levers 60 to pivot on their respective fulcrums 66 against the bias of coil spring 76. A flow of gaseous fuel may now be traced from a source (not shown) through the inlet port 12, the valves eat 50, the gas cock valve chamber 20, the gas cock port 22, the outlet port 14 and the conduit C leading to the burner B.

The burner B may now be ignited by any suitable means such as a match or a standby pilot burner. Due to the quick response of the mercury to the flame F, the power element 80 will expand and move the plug 70 slightly to the left as viewed in FIGURE 1 causing the plug fulcrum 68 to maintain the levers 60 and the valve stem 56 in a valve open position. Upon release of the shaft 38 and push rod 24, the levers 60 are prevented from moving to a valve closed position because the force of the power element shaft 78 and the moment arm to the plug fulcrum 68 result in a force that is greater than the biasing force of the coil spring 76. In the event the flame F should be accidentally or otherwise extinguished, the mercury will rapidly return to its liquid state and the power element 80 will contract to its unstressed condition; the plug 70 will then move slightly to the right as viewed in FIGURE 1 whereby the coil spring 76 will cause the levers 60 to pivot on their respective fulcrums 66 and move the valve stem 56 and safety valve 52 to a valve closed position and shut off the flow of fuel to the burner B. If it is desired to reignite the fuel burner B, the flow of fuel may be reestablished by depressing the control knob and shaft 38 which will move the safety valve member 52 to its open position.

If it is desired to shut off the operation manually, the control shaft 38 may be rotated clockwise from the front (counterclockwise as viewed in FIGURE 2) whereby the gas cock port 22 is moved out of registry with the passageway to the outlet port 14; upon interruption of the fuel flow to the burner B the flame F is extinguished and the safety valve 52 is moved to a closed position as described above.

In accordance with the present invention, all the operating elements are aligned on the same longitudinal axis resulting in a simple compact structure. The lever system permits opening of the safety valve member in a direction opposite to the movement of the expanding power element and the safety valve member is provided with a larger lift movement than the movement of the power element.

Inasmuch as only one embodiment of the present invention has been presented herein, and inasmuch as the invention is subject to many variations, modifications and changes in construction, it is intended that all matter contained in the foregoing description or shown on the accompanying drawing, shall be interpreted as illustrative and not in a limiting sense.

What is claimed is:
1. In a control device, the combination comprising a housing having inlet and outlet means separated by an annular valve seat, said housing having inner wall means defining fixed fulcrum means, a valve member cooperating with said valve seat to control a fluid flow between said inlet and outlet means, a valve stem having a free end and an opposite end secured to said valve member, lever means having inner and outer portions and fulcrum bearing means therebetween, said inner portions being operatively connected to said valve stem adjacent its free end, said fulcrum bearing means engaging said fulcrum means whereby said lever means is pivotally mounted in said housing, an actuating plug member engaging said outer portions of lever means, said plug member having a central recess receiving the free end of said valve stem and an annular recess concentric to said central recess, coil spring means having one end disposed in said concentric recess and an opposite end normally biasing said lever means to be pivoted to a valve closing position, thermally responsive means engaging said plug member for moving the same to an actuated position wherein said plug member exerts greater force on said lever means than the bias of said resilient means whereby said lever means retains said valve member in a valve opening position, and reset means including a push rod for moving said valve means, said valve stem and said lever means to a valve opening position.

2. The combination as recited in claim 1, wherein said valve stem includes a reduced portion adjacent its free end and said lever means comprises a pair of oppositely disposed levers each having a notched portion engaging the reduced portion of said valve stem.

3. In a control device for controlling a flow of fuel to a burner, the combination comprising a housing having an inlet and an outlet, first valve means in said housing movable between a plurality of positions for controlling a flow of fuel out of said housing, a second valve means disposed in said housing upstream of said first valve means for controlling a flow of fuel into said housing, a stem having a free end and an opposite end secured to said second valve means and having a reduced portion adjacent the free end, a pair of T-shaped levers each having a notched portion engaging said stem reduced portion to define an operative connection therewith, fixed fulcrum means on an internal wall of said housing engageable by said levers for pivoting thereon between a valve holding position and a valve releasing position, a plug member axially movable in said housing and having a portion engaging said levers on surfaces opposite to said fulcrum means and being disposed radially outwardly of said fulcrum means, said plug member having a central recess receiving the free end of said stem and an annular recess concentric to the central recess, coil spring means disposed in the annular recess and mounted in compression between said plug member and said levers for normally biasing the same to their valve releasing position, thermally responsive means operatively engaging said plug member and adapted for moving the same in response to a flame at the burner whereby the engaging portion of said plug member exerts a greater force on said levers than said coil string means and retains said levers in a valve holding position, said levers being pivoted by said coil spring means to a valve releasing position in response to extinguishment of the flame at the burner, and reset means including a push rod slidably carried by said first valve means and movable relative thereto to actuate said second valve means to a valve open position.

References Cited by the Examiner

UNITED STATES PATENTS

| | | | |
|---|---|---|---|
| 2,076,045 | 4/37 | Schaefer | 236—1 X |
| 2,438,447 | 3/48 | Maynard | 236—48 |
| 2,672,292 | 3/54 | Caparone et al. | 158—140 X |
| 2,797,872 | 7/57 | Eskin | 236—48 |
| 2,822,135 | 2/58 | Winslow | 236—99 |
| 3,064,900 | 11/62 | Ages | 236—1 |

JAMES W. WESTHAVER, *Primary Examiner.*

FREDERICK KETTERER, *Examiner.*